Patented Apr. 18, 1950

2,504,779

UNITED STATES PATENT OFFICE 2,504,779

LUBRICATING GREASE

David W. Young, Roselle, and William H. Smyers, Westfield, N. J., assignors to Standard Oil Development Company, a corporation of Delaware No Drawing. Application October 18, 1947, Serial No. 780,766

9 Claims. (Cl. 252—39)

This invention relates to lubricating grease compositions and particularly to greases which contain copolymer additives for the purpose of improving their viscosity, tackiness and related characteristics. The invention relates further to a method of compounding a grease composition of improved properties by incorporating therein copolymers of aliphatic monoolefins and aromatic olefins having particularly desirable properties.

It has previously been suggested in the U. S. patent to Smyers, No. 2,274,749, that copolymers of alkenes and cyclic hydrocarbons, such as copolymers of isobutylene and styrene, may be prepared by low temperature polymerization in the presence of a suitable catalyst. Such copolymers may be prepared at various low temperatures, for example, $-10°$ C., $-50°$ C., $-80°$ C., and as low as $-103°$ C., or even lower with some materials. By adjusting the proportions of the two raw materials, copolymers may be obtained having desired properties of hardness, melting point, plasticity and the like.

Copolymers of the character described above may be referred to conveniently as "cycalkene" copolymers or more briefly as "cycalkenes." The specific copolymer which may vary considerably in molecular weight and in other properties, made from styrene and isobutylene, may be referred to briefly as "stybutene." Reference will be made hereinafter to the invention as applied particularly to "stybutene" although it will be understood that it is not limited specifically thereto. It has been suggested in the above patent that "cycalkene" copolymers may be used in various compositions, including lubricating oils and greases. Although the patent describes copolymers which may vary widely in molecular weight and in composition, including as little as 5% to as much as 90% of the cyclic constituent, it has only recently been discovered, and constitutes one feature of this invention, that certain specific types of such copolymers not specifically disclosed therein have particular utility for certain purposes in lubricants and other soap-containing compositions. An object of the present invention is to provide a novel method for incorporating these or any other types of "stybutene" or other "cycalkene" in lubricating greases in a manner which produces a novel type of grease product.

One feature of the invention comprises compounding into a grease containing a soap type thickener a "cycalkene" copolymer, preferably a "stybutene," having an intrinsic viscosity greater than 0.5 and containing from 40 to 65% by weight of the cyclic constituent. Thus, in the case of "stybutene" the copolymer will contain between 40 and 65% by weight of styrene, preferably 50 to 60%. Correspondingly, the aliphatic olefin should range between 60 and 35% with a preferred range of 50 to 40%. Where other raw materials than isobutylene and/or styrene are used, the proportions will be adjusted so as to obtain a high intrinsic viscosity, greater than 0.5. Other raw materials are the aliphatic mono-olefins having more than 2 carbon atoms, preferably 4 to 8 carbon atoms. Instead of styrene other polymerizable cyclic mono-olefinic hydrocarbons may be used such as substituted styrenes, for example, alpha methyl styrene, para methyl styrene, indene, or terpene and the like.

The term "intrinsic viscosity" as used in this specification means the viscosity coefficient obtained according to the method set forth in an article by Paul J. Flory in J. A. C. S., volume 65, pages 372–382, 1943, entitled "Molecular weights and intrinsic viscosities of polyisobutylenes." Briefly, the intrinsic viscosity coefficient is a measure of the oil thickening power of the polymer which is approximately proportional to its molecular weight.

The present invention is concerned particularly with "stybutene" or other "cycalkene" having an intrinsic viscosity greater than 0.5 and preferably 0.7 or 0.8, and up to 3.0, or even higher.

As suggested above, the intrinsic viscosity of copolymers of the type just referred to is related more or less directly to their molecular weights. The molecular weights are related, in turn, to the temperature of copolymerization, being greater as the temperature is lowered. Thus the copolymers of the preferred type, having a styrene content of 40 to 65% by weight, preferably 50 to 60%, to be incorporated into greases according to the present invention, are of fairly high molecular weight and are necessarily polymerized at a low temperature. The temperature of polymerization should be as low as practicable, for example, at least as low as $-80°$ C. and preferably below $-100°$ C., for example $-101°$ to $-103°$ C. Below $-103°$ C. the styrene may begin to freeze out of some solvents before polymerization can take place; thus the nature of the materials polymerized places practical limits on the polymerization process which can be used. The lowest practical polymerizating temperatures appear to produce the best results when the copolymer is to be used in lubricating grease. The controlling factor for such use, however, is the intrinsic viscosity of the polymer and not necessarily its formula or process of preparation. The invention contemplates the use of other and analogous alkene-aromatic olefin copolymers having similar properties and high intrinsic viscosity.

The copolymerization is effected by mixing the two reactants, with or without a mutual solvent, such as ethylene, propane, butane, methyl chloride, methyl fluoride, ethyl chloride, ethyl fluoride, refined naphtha, etc., and then after cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex-(AlCl₃.Al[OC₂H₅]₃) and the like. If desired, such catalyst may be dissolved in a solvent such as carbon disulfide, a low molecular weight sulfur-free saturated hydrocarbon, a lower alkyl halide, e. g. methyl chloride or -fluoride, or in ethyl chloride or -fluoride, in a mixture of methyl chloride with butane, or other lower saturated hydrocarbons, at or below the boiling point of the catalyst solvent. The catalyst solution is then cooled down, filtered and added to the reaction mixture. Alternative catalysts which may be used include: AlCl₃.AlCl₂OH, AlBr₃.AlBr₂OH, AlBr₂Cl.AlOCl, AlBrCl₂.AlOBr, TiCl₄.AlCl₂OH, TiOCL₂.TiCl₄, AlBr₃.Br₂.CS₂, BF₃.isopropyl alcohol, BF₃ in methyl fluoride, BF₃ solution in ethylene, and activated BF₃ catalyst in methyl chloride solution. Volatile solvents or diluents, e. g. propane, ethane, ethylene, methyl chloride, carbon dioxide (liquid or solid), etc., may also serve as internal or external refrigerants to carry off the liberated heat of polymerization. After completion of the copolymerization, any residual catalyst is killed or inactivated with alcohol, for example, isopropyl alcohol, and excess catalyst is removed by washing the product (which was precipitated out of solution by the alcohol) with water and preferably also with dilute aqueous caustic soda. In physical characteristics the resulting solid copolymer may range from a relatively stiff plastic mass to a hard, tough, thermoplastic solid, depending upon the temperature of polymerization, the yield of polymer obtained from the active feed, the type, concentration and purity of the catalyst, the proportion of cyclic reactant in the feed, and the temperature at which the physical texture is observed. The proportions in which the reactants, e. g. styrene and isobutylene, have actually combined during copolymerization may be determined by interpolation of a carbon-hydrogen analysis between the limits, for instance:

|  | Carbon | Hydrogen |
| --- | --- | --- |
|  | Percent | Percent |
| Pure styrene | 92.3 | 7.7 |
| Pure isobutylene | 85.7 | 14.3 |

Generally the molecular weight of the copolymers made under the particular conditions referred to above will range from about 10,000 upwards, for instance, 15,000, 25,000, 50,000, 100,000 and even higher, and the intrinsic viscosity of these copolymers will be above 0.5, e. g. 0.6, 0.8, 1.2, 1.5, 2.0, and up to 3.0, or even higher. Usually copolymers having the higher molecular weights will be made at the lowest copolymerization temperatures and with the lower proportions of cyclic constituent. Particular copolymer fractions of high intrinsic viscosity and good solubility in the desired mineral oil basestock, may be separated from the crude copolymerization product by various methods, such as solvent extraction, precipitation by alcohol, etc.

It has long been known that various resins and rubbery materials may be added to mineral lubricating oils, greases, and the like and it has also been known that polybutene, especially the soft sticky polybutene of about 15,000 mol. wt., is useful for such purposes. Polybutene, however, is incompatible with fatty oils and when fatty oils are added to mineral oil containing polybutene, especially a tough polybutene having molecular weight of the general order mentioned and an intrinsic viscosity above 0.5, the latter is precipitated.

In many types of lubricants, and particularly in lubricating greases, it is desirable to add fatty material which may then or thereafter be wholly or only partly saponified to form a so-called grease structure. Copolymers of the type referred to above, particularly those having an intrinsic viscosity above 0.5, are superior to polybutene of similar molecular weight, in that they are soluble in or at least compatible with fatty oils and are not precipitated out of mineral oil when fatty constituents are added. Hence, lubricating greases containing these tough "stybutene" and analogous "cycalkene" copolymers are more stable in physical structure than those which contain polybutene and related materials as thickeners, tackiness agents and the like. By the use of the specific copolymers mentioned above, having high intrinsic viscosity, new and desirable properties of tackiness, adhesiveness to metal, stability against oil separation and the like are imparted to standard soap-thickened lubricating greases.

Although the copolymers may be incorporated into a grease by the same procedure used for polybutene, namely, by mixing it into the hot grease, i. e. after the fatty acid has been neutralized or the fat or fatty oil saponified, another feature of this invention comprises mixing the copolymer with the mineral oil and the fatty material before the latter is converted into soap to form the grease. By this procedure the copolymer appears to be intimately and homogeneously incorporated into the colloidal grease structure as well as in the free oil phase of the grease. This results in an extremely stable composition, as regards mechanical and storage stability, in addition to providing the adhesive and tacky qualities referred to above. The viscosity-temperature relation, water-resistance and other characteristics are also improved.

Greases prepared according to the present invention are preferably compounded by dissolving a fat or fatty acid, for example hydrogenated fish oil acids, oleic acid, palmitic acid, petroleum naphthenic acids, stearic acid, etc., and/or various polymerized fatty oils, in a lubricating oil solution containing the "stybutene" or equivalent copolymer in appropriate quantities. Generally the amount of copolymer will vary from 0.1 to 10% by weight, based on the total composition. A preferred range is between 0.5 and 3% of the copolymer. The soap or grease can be made in a concentrated form in the presence of the copolymer, and then later diluted with mineral oil.

The above described mixture of lubricating oil containing the copolymer and the fatty material is preferably agitated and/or stirred well to obtain a good solution, and heated to a temperature, for example, of 200° to 250° F. Thereafter the mixture is neutralized or saponified in the usual manner by adding a solution or slurry of saponifying agent such as caustic soda, caustic potash, hydrated lime, barium hydroxide, or aluminum hydroxide. If aluminum hydroxide is used, it is preferably in the gelatinous form. Other metal oxides or hydroxides may be used such as zinc oxide or lead oxide, or mixtures of various saponifying materials may be employed as is well known in the art.

The mixture prepared as above is next further heated, especially in the case of alkali metal soaps, preferably with continued stirring, to a temperature sufficient to drive off water and other volatile reaction products and to secure the desired grease structure. Heating temperatures may be varied from 300 to 450° F. or more depending upon the melting point characteristics and other properties of the particular metal soap employed as thickener. After cooking is completed the grease is cooled in a suitable manner, either by being allowed to stand or by passing it through a mechanical cooler to lower the temperature. Thereafter the grease may be filtered or screened and packaged in the conventional manner.

This invention may also be applied to the production of gelled or solidified gasoline, for example, as used in so-called thickened fuels. In this case a suitable copolymer, preferably a styrene-isobutylene copolymer as described above, containing between 40 and 65% styrene, preferably 50 to 60% by weight, and having an intrinsic viscosity of at least 0.5 and preferably 0.7 or 0.8 or more, is dissolved in a gasoline solution of stearic acid and the composition is thereafter saponified with caustic soda, lime, or other suitable metal oxide or hydroxide.

A particular aspect of the present invention is the specific method or procedure preferably used to obtain a satisfactory grease with desirable qualities of tackiness, stringiness, adhesion to metals and the like. By dissolving the styrene-isobutylene or like copolymer, in the solution of mineral oil and fat which is to be saponified, and doing this prior to the saponification step, the copolymer appears to enter directly into the grease structure and does not precipitate out when the composition is chilled. It is also quite stable against oil separation during storage.

The qualities of the various ingredients used in our improved composition, and their respective proportions, may be varied within rather wide limits. Thus a lubricating grease of stiff consistency might contain as much as 20% or even 30% by weight of soap, that is, saponified fatty material, and as much as 5% to 10% or even more of the copolymer described above. On the other hand, a very thin grease of satisfactory composition may contain as little as 5% by weight of the metal soap and 0.1% of the copolymer. Hence the invention comprises lubricants containing about 60% to 95% by weight of mineral base lubricating oil, 5% to 30% of soap and 0.1 to 10% of the copolymer of isobutylene and styrene containing 50% to 60% styrene and having an intrinsic viscosity of at least 0.5 and preferably about 0.8 or more. As shown in the examples below, particularly good results are obtained by using 1 to 3% of the copolymer with greases containing various quantities of soap within the limits mentioned above.

As will be understood by those skilled in the art, the proportions will usually be varied within narrower limits, a preferred range being from 75 to 90% lubricating oil or mineral base oil by weight, with 10 to 20% of soap, and 0.5 to 5% of the copolymer. In lieu of soap, other well known thickeners which produce a colloidal grease structure may be used. Thus acetylene black may be employed in proportions of about 5 to 15% by weight, to set up the lubricant to a grease consistency.

The copolymers mentioned above have desirable properties of tackiness, and adhesiveness which make them very useful in various greases. They improve adhesion of lubricating greases to metal, reducing spattering and leakage from bearings. They are more stable to severe shear stresses than greases containing polybutene; hence lubricants containing them show less tendency to break down structurally when fed through commercial grease dispensing apparatus such as pressure guns and the like. When subjected to high speed spindle tests, greases containing the copolymer of high intrinsic viscosity, according to our invention, appear to show less change in structure and viscosity than those containing simple polymers such as polybutene.

Other additives may be added to these greases, e. g. anti-oxidants, dyes, pour depressors, extreme pressure agents, etc. If desired, a styrene-isobutylene copolymer of low intrinsic viscosity, e. g. 0.1-0.5, may be added to a grease in which some high intrinsic viscosity copolymer has already been incorporated, preferably prior to saponification.

The preferred procedure of this invention, i. e. adding the cycalkene copolymer prior to saponification, also effects unobvious results when applied to the previously known types of "cyalkene" copolymers disclosed in Patent No. 2,274,749, e. g. a "stybutene" of 10-35% combined styrene content and an intrinsic viscosity of 0.1 to 0.5. If desired, such a copolymer can be incorporated in a grease before saponification and the same or a different kind of "cycalkene" copolymer added after saponification. A "stybutene" having an intrinsic viscosity above 0.5, but having a low styrene content, e. g. 5-30%, has good adhesiveness and tackiness, and is soluble in mineral oil but is not soluble in fatty oils; therefore, it cannot be incorporated before saponification, but can be added afterward. Alternatively, the preferred type and even the other known types of "cycalkene" copolymers can be dissolved in some mineral oil in which the neutralizing or saponifying agent, e. g. lime, caustic soda, etc., may be dispersed and then reacted with the mineral oil solution of the fat or fatty acid.

The following examples are given for the sake of illustrating the invention.

*Example 1*

3% by weight, based on the final grease composition, of a styrene-isobutylene copolymer made at −103° C. and having an intrinsic viscosity of 0.8 and about 50% combined styrene, and 10% of stearic acid, were dissolved by mixing and heating in a major part of the required mineral lubricating oil having a viscosity of about 40 seconds Saybolt at 210° F. An amount of hydrated lime required to combine with the stearic acid was stirred into a similar oil to a slurry consistency and the slurry was added to the mineral oil solution of copolymer and stearic acid with continued heating and stirring until tests showed that the neutralization was substantially complete. The resulting lime grease was cooled and found to be very stable against oil separation or mechanical breakdown.

*Example 2*

The process of Example 1 was repeated, except that just before cooling, 2% by weight of a lower molecular weight "stybutene," having an intrinsic viscosity of 0.4 and 10% combined styrene, was added and stirred until well mixed. Thereafter the composition was finally cooled. The grease had good adhesion characteristics and good stability.

Example 3

The process of Example 2 was reversed, by incorporating the low intrinsic viscosity copolymer before saponification, and the higher one after. The grease was found to be stable but tougher in texture than that of Examples 1 and 2.

Example 4

7.086 g. of isobutylene-styrene copolymer (60% styrene by analysis and an intrinsic viscosity as defined above, of 0.8) was blended on a microrubber mill at 125° F. with 2.22 g. of soya bean oil polymer (m. wt. of soya bean polymer was 3,800). The soya bean oil polymer was made by the $BF_3$ catalytic polymerization of soya bean oil at room temperature. The clear transparent blended product in film form, was added to mineral oil. The type of oil was a mixed base lubricating oil having a viscosity index of 40 and a viscosity at 210° F. of 55 S. S. U. The oil polymer blend was placed in a 100 ml. Pyrex beaker and 5.00 cc. of 1-normal KOH was added. As the mixture was slowly heated to 150° F. and then heated at 150° F. for about 1½ hours 53 cc. of 1-normal KOH were slowly added as additional alkali. After this treatment the mixture was cooled to room temperature. The resulting grease was sticky and had good string characteristics. The string was determined by placing 0.3 g. of the product on a steel table and touching the grease with the first finger and then slowly lifting the finger at room temperature. The grease adhered to the finger as well as to the steel table and a thin string of grease was noticed to be present even when the finger was raised as much as 8 to 12 inches above the steel table.

Example 5

A grease was made by dissolving 7 g. of isobutylene-styrene copolymer (60% styrene by analysis and an I. V. of 0.2) with 3 g. of soya bean oil. 10 g. of a mineral oil with a viscosity index of 40 and an S. S. U. viscosity at 210° F. of 55. To this mixture was added 32 cc. of 1-normal KOH. The mixture was slowly heated to a range of 150° F. to 300° F. for 2.8 hours. As the grease was being made 6 g. of the same mineral oil as described above was slowly added. Therefore, a total of 16 g. of mineral oil was used. The final grease at room temperature was clear and homogeneous. However, this grease did not have any noticeable string when tested by the procedure tested under Example 4.

Example 6

A grease was prepared from the following materials:

12.2% hydrogenated fish oil by weight
2.1% NaOH
0.4% glycerin
84.3% blended mineral lubricating oil
1.0% copolymer [1]

[1] Styrene-isobutylene copolymer (50% styrene and intr. visc. of 0.9).

The fish oil was first dissolved in 90% of the total amount of mineral oil with heat and stirring, then the NaOH was added, and the mixture was heated to about 400° F. until saponification was completed. Then there was added the last 10% of the mineral lubricating oil, containing the previously dissolved copolymer. As the mixture started to cool, the glycerine was added with stirring, and then the composition was allowed to cool to room temperature. This composition had good stringiness, as in Example 4, but had somewhat different grease structure characteristics, and not quite as good storage stability in regard to syneresis, oil separation and related phenomena.

We claim:

1. A lubricating grease composition consisting essentially of 67 to 94% by weight of lubricating oil, 5 to 30% of a thickener to impart a colloidal grease structure to said oil, and 1 to 3% of a "cycalkene" copolymer containing between 40 and 65% by weight of a cyclic constituent and having an intrinsic viscosity above 0.5.

2. A lubricating grease according to claim 1, also having mixed therein but not within the colloidal structure, a soft tacky adhesive styrene-isobutylene copolymer.

3. A process of preparing a tacky stable lubricating grease which comprises the steps of adding to lubricating oil from 0.5 to 10% by weight, based on the finished composition, of a copolymer of isobutylene and styrene having an intrinsic viscosity of at least 0.1 and thereafter forming a soap in situ in said oil to incorporate said polymer into the grease structure.

4. Process according to claim 3 wherein said copolymer has an intrinsic viscosity of at least 0.8.

5. The process of making a soap-copolymer composition, which comprises dissolving a "cycalkene" copolymer in a fatty material and then converting the latter to a soap.

6. Process according to claim 5 followed by dilution with mineral oil to make a lubricating grease.

7. A lubricating grease composition consisting essentially of 87 parts by weight of mineral lubricating oil, 10 parts of stearic acid saponified with lime, and 3 parts of a styrene-isobutylene copolymer containing about 50% by weight of combined styrene, polymerized at low temperature and having an intrinsic viscosity of about 0.8 said copolymer having a molecular weight of at least 10,000.

8. A lubricating grease composition consisting essentially of 67 to 94% by weight of lubricating oil, 5 to 30% of a thickener to impart a colloidal grease structure to said oil, and 1 to 3% of a copolymer of styrene and isobutylene, said copolymer containing between 40 and 65% by weight of the styrene constituent and having an intrinsic viscosity above 0.5.

9. Composition according to claim 8 wherein said thickener is a metal soap of fatty material.

DAVID W. YOUNG.
WILLIAM H. SMYERS.

REFERENCES CITED

The following references are of record in the file of this patent:

UNITED STATES PATENTS

| Number | Name | Date |
|---|---|---|
| 2,084,500 | Otto et al. | June 22, 1937 |
| 2,085,693 | Byrne | June 29, 1937 |
| 2,189,873 | Zimmer et al. | Feb. 13, 1940 |
| 2,213,423 | Wiezevich | Sept. 3, 1940 |
| 2,274,749 | Smyers | Mar. 3, 1942 |
| 2,282,456 | Christmann et al. | May 12, 1942 |
| 2,335,608 | Pings | Nov. 30, 1943 |
| 2,421,082 | Pier et al. | May 27, 1947 |